US012811644B2

(12) United States Patent
Lee

(10) Patent No.: US 12,811,644 B2
(45) Date of Patent: Nov. 24, 2026

(54) OPERATING METHOD OF ELECTRONIC DEVICE FOR VERIFYING WHETHER ABNORMAL PATH OUTPUT EXISTS BEFORE MANUFACTURING PHASED ARRAY ANTENNA

(71) Applicant: ELECTRONICS AND TELECOMMUNICATIONS RESEARCH INSTITUTE, Daejeon (KR)

(72) Inventor: Sung Jun Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 137 days.

(21) Appl. No.: 18/940,028

(22) Filed: Nov. 7, 2024

(65) Prior Publication Data

US 2025/0219691 A1 Jul. 3, 2025

(30) Foreign Application Priority Data

Dec. 27, 2023 (KR) ........................ 10-2023-0193320

(51) Int. Cl.
*H04B 7/06* (2006.01)
*H01Q 3/36* (2006.01)
*H04B 17/15* (2015.01)

(52) U.S. Cl.
CPC ............. *H04B 7/0617* (2013.01); *H01Q 3/36* (2013.01); *H04B 17/15* (2015.01)

(58) Field of Classification Search
CPC ......... H04B 7/0617; H04B 17/15; H01Q 3/36
See application file for complete search history.

(56) References Cited

U.S. PATENT DOCUMENTS 8,259,686 B2 * 9/2012 Kanto ...................... H01Q 3/36 455/562.1
8,347,161 B2 1/2013 Park et al.
(Continued)

FOREIGN PATENT DOCUMENTS

KR 10-1343991 B1 12/2013
KR 10-2022-0105327 A 7/2022
(Continued)

OTHER PUBLICATIONS

Yun Wang et al., "39-GHz 64-element phased-array transceiver with built-in phase and amplitude calibrations for large-array 5G NR in 65-nm CMOS," IEEE Journal of Solid-State Circuits, 2020, vol. 55, No. 5.

*Primary Examiner* — Dominic E Rego

(57) ABSTRACT

The operating method of an electronic device includes obtaining, by frequencies, N-1 first transmission matrices for N-1 first 2-port networks having, as two ports, i) an input of a reference element antenna, which is any one of N element antennas included in a virtual phased array antenna, and ii) an input of a just before integrated circuit (IC) driving any one of remaining N-1 element antennas, excluding the reference element antenna from the N element antennas, obtaining, by frequencies, N-1 second transmission matrices for N-1 second 2-port networks having, as two ports, an input and output of the just before IC driving each of the remaining N-1 element antennas, and performing a simulation to determine whether there is an abnormal path output based on the N-1 first transmission matrices and the N-1 second transmission matrices.

17 Claims, 11 Drawing Sheets

(56) References Cited

U.S. PATENT DOCUMENTS

| | | | | |
|---|---|---|---|---|
| 8,391,392 | B2 * | 3/2013 | Melzer | H04B 7/0617 375/267 |
| 9,584,231 | B2 * | 2/2017 | Xu | H01Q 3/36 |
| 9,882,279 | B2 * | 1/2018 | Bull | H04B 7/0617 |
| 10,236,966 | B2 * | 3/2019 | Brunel | H01Q 1/246 |
| 10,862,192 | B2 | 12/2020 | Moallem et al. | |
| 11,005,581 | B1 * | 5/2021 | Gomadam | H04B 17/12 |
| 11,128,041 | B2 * | 9/2021 | Luna | H04B 7/0617 |
| 11,171,416 | B2 * | 11/2021 | Ferguson | H01Q 3/267 |
| 11,296,407 | B2 * | 4/2022 | Sanford | H01Q 1/1228 |
| 11,482,791 | B2 | 10/2022 | Vigano et al. | |
| 11,611,400 | B2 * | 3/2023 | Kong | H01Q 3/2605 |
| 11,688,941 | B2 * | 6/2023 | Vilenskiy | H01Q 13/10 342/372 |
| 12,136,977 | B2 * | 11/2024 | Pepin | H01Q 21/065 |
| 2010/0248656 | A1 * | 9/2010 | Zhou | H04B 7/0874 455/101 |
| 2013/0222172 | A1 * | 8/2013 | Sentelle | G01S 13/888 342/22 |
| 2014/0056379 | A1 * | 2/2014 | Jongren | H04L 25/03343 375/267 |
| 2014/0140435 | A1 * | 5/2014 | Zhang | H04L 5/0023 375/295 |
| 2015/0207233 | A1 | 7/2015 | Kim et al. | |
| 2016/0337054 | A1 * | 11/2016 | Long | H04L 1/1893 |
| 2017/0163327 | A1 * | 6/2017 | Yang | H04B 7/0413 |
| 2017/0195019 | A1 * | 7/2017 | Shang | H04B 7/0452 |
| 2018/0026672 | A1 * | 1/2018 | Haine | H04B 1/582 333/126 |
| 2018/0278316 | A1 * | 9/2018 | Yang | H04B 7/0456 |
| 2019/0288807 | A1 * | 9/2019 | Zhang | H04B 7/0413 |
| 2019/0319680 | A1 * | 10/2019 | Zhang | H04B 7/0408 |
| 2019/0326969 | A1 * | 10/2019 | Jiang | H04B 7/0817 |
| 2021/0314037 | A1 * | 10/2021 | Rahman | H04B 7/0404 |
| 2021/0359733 | A1 * | 11/2021 | Harrison | H04B 7/0486 |
| 2023/0336221 | A1 * | 10/2023 | Kang | H04B 7/0404 |
| 2025/0357974 | A1 * | 11/2025 | Sun | H04B 7/0486 |

FOREIGN PATENT DOCUMENTS

| | | | |
|---|---|---|---|
| KR | 10-2023-0093849 | A | 6/2023 |
| KR | 10-2545026 | B1 | 6/2023 |
| WO | 2004/059876 | A1 | 7/2004 |

* cited by examiner

OPERATING METHOD OF ELECTRONIC DEVICE FOR VERIFYING WHETHER ABNORMAL PATH OUTPUT EXISTS BEFORE MANUFACTURING PHASED ARRAY ANTENNA

CROSS-REFERENCE TO RELATED APPLICATION(S)

This application claims the priority benefit of Korean Patent Application No. 10-2023-0193320 filed on Dec. 27, 2023, in the Korean Intellectual Property Office, the disclosure of which is incorporated herein by reference for all purposes.

BACKGROUND

1. Field

One or more embodiments relate to a verifying method prior to manufacturing a phased array antenna, and more specifically, to the verifying method of determining whether there is an abnormal path output prior to manufacturing the phased array antenna including an active element.

2. Description of Related Art

There may be a situation where a high-gain antenna is necessary in response to a large path loss in an mmWave band. In this case, a phased array antenna may be required to electrically control a beam direction, to cope with a narrow beam width due to a high gain. To electrically steer a beam, each element antenna included in the phased array antenna should be driven to a value determined according to a target beam direction. When each element antenna is driven as intended, the beam direction of the phased array antenna may face the target direction.

Driving circuits configured to drive element antennas are collectively referred to as a beam forming network (BFN). The BEN may control the phase of, or the phase and amplitude of, driving signals for element antennas connected to the BFN. To drive N element antennas, the BFN should have N paths.

The BEN may include a plurality of beam forming integrated chips (BFICs). That is, the phased array antenna may be formed of a combination of the plurality of BFICs and an array antenna. For example, the array antenna including 32 element antennas should have 32 paths. In this case, the BEN may be composed of 8 BFICs each of which having 4 channels.

When combining the BEN including the plurality of BFICs with the array antenna, an antenna in package (AiP) form, which integrally implements the BEN and the array antenna on a multilayer substrate, may be used.

SUMMARY

An aspect provides a method and device for verifying, at a design stage prior to manufacturing, whether an abnormal path output that may occur in a phased array antenna in an antenna in package (AiP) form exist.

Another aspect also provides a method and device for determining whether an abnormal path output has occurred through simulation, prior to manufacturing a phased array antenna.

According to an aspect, there is provided an operating method of an electronic device including obtaining, by frequencies, N-1 first transmission matrices for N-1 first 2-port networks having, as two ports, i) an input of a reference element antenna, which is any one of N element antennas included in a virtual phased array antenna, and ii) an input of a just before integrated circuit (IC) driving any one of remaining N-1 element antennas, excluding the reference element antenna from the N element antennas; obtaining, by frequencies, N-1 second transmission matrices for N-1 second 2-port networks having, as two ports, an input and output of the just before IC driving each of the remaining N-1 element antennas; obtaining a amplitude and time delay of signal transmission from the input of the reference element antenna to each input of the remaining N-1 element antennas, based on each result of respectively multiplying the N-1 first transmission matrices by the N-1 second transmission matrices respectively corresponding to the N-1 first transmission matrices; and, by applying the amplitude and time delay of the signal transmission from the input of the reference element antenna to each input of the remaining N-1 element antennas, performing a simulation to determine whether there is an abnormal path output which means there is an output through at least one of the remaining N-1 element antennas via the just before ICs, even though a signal is only applied to the input of the reference element antenna.

The obtaining of, by frequencies, the N-1 first transmission matrices may include, by obtaining, through computational electromagnetics (CEM), a scattering matrix for an N-port network using, as N ports, an input of the reference element antenna of the virtual phased array antenna and inputs of the just before ICs driving the remaining N-1 element antennas excluding the reference element antenna, obtaining a scattering matrix of the N-1 first 2-port networks and obtaining the N-1 first transmission matrices by transforming the scattering matrices respectively for the first 2-port networks into transmission matrices.

The obtaining of, by frequencies, the N-1 second transmission networks may include obtaining the N-1 second transmission matrices by transforming scattering matrices respectively for the just before ICs into transmission matrices.

The N-1 second transmission matrices may be transmission matrices for beam forming integrated circuits (BFICs) when the just before ICs are BFICs.

The N-1 second transmission matrices may be transmission matrices for power amplifier integrated circuits (PAICs) when the just before ICs are PAICs.

The obtaining of, by frequencies, the N-1 second transmission matrices may include transforming a transmission matrix of a transmission line having a length corresponding to a group delay of each of the just before ICs into a scattering matrix, multiplying a gain of each of the just before ICs by a corresponding element of the scattering matrix, and transforming the scattering matrix back into the transmission matrix.

The obtaining of the amplitude and time delay of the signal transmission for each of the remaining N-1 element antennas may include obtaining, by frequencies, N-1 third transmission matrices for N-1 third 2-port networks having, as two ports, i) the input of the reference element antenna and ii) the output of the just before IC driving any one of the remaining N-1 element antennas by respectively multiplying the N-1 first transmission matrices by the N-1 second transmission matrices respectively corresponding to the N-1 first transmission matrices; respectively transforming the N-1 third transmission matrices obtained by frequencies into scattering matrices; and obtaining the amplitude and time delay of the signal transmission for each of the remaining N-1 element antennas, based on the scattering matrices.

The obtaining of the amplitude and time delay of the signal transmission for each of the remaining N-1 element antennas, based on the scattering matrices, may include performing an inverse Fourier transform on elements, among elements of the scattering matrices, indicating a channel frequency response (CFR) to a signal path from the input of the reference element antenna to the output of the just before IC driving any one of the remaining N-1 element antennas and obtaining a channel impulse response (CIR) to the signal path for each of the remaining N-1 element antennas; and obtaining the amplitude and time delay of the signal transmission for each of the remaining N-1 element antennas, based on the CIR to the signal path obtained for each of the remaining N-1 element antennas.

The obtaining of the amplitude and time delay of the signal transmission for each of the remaining N-1 element antennas, based on the CIR to the signal path obtained for each of the remaining N-1 element antennas, may include, when the CIR has one response, determining the amplitude and time delay of the response to be the amplitude and time delay of the signal transmission, and, when the CIR has a plurality of responses distinct in time, determining the amplitude and time delay of a response having the largest lobe among the plurality of responses to be the amplitude and time delay of the signal transmission.

The performing of the simulation may include performing excitation on the reference element antenna through a drive signal for driving the reference element antenna and simultaneously performing excitation on the remaining N-1 element antennas through signals having the amplitude and time delay of the signal transmission obtained compared to the drive signal and performing a CEM simulation to obtain a frequency response of a signal received by a virtual probe; obtaining a CIR by performing an inverse Fourier transform on the frequency response of the received signal; and determining there is the abnormal path output when the CIR has a plurality of responses distinct in time.

According to another aspect, there is provided an operating method of an electronic device includes obtaining, by frequencies, N-1 first transmission matrices for N-1 first 2-port networks having, as two ports, i) an input of a reference element antenna, which is any one of N element antennas included in a virtual phased array antenna, and ii) an input of a just before IC driving any one of remaining N-1 element antennas, excluding the reference element antenna from the N element antennas; obtaining, by frequencies, N-1 second transmission matrices for N-1 second 2-port networks having, as two ports, an input and output of the just before IC driving each of the remaining N-1 element antennas; obtaining, by frequencies, N-1 third transmission matrices for N-1 third 2-port networks having, as two ports, i) the input of the reference element antenna and ii) the output of the just before IC driving any one of the remaining N-1 element antennas by respectively multiplying the N-1 first transmission matrices by the N-1 second transmission matrices respectively corresponding to the N-1 first transmission matrices; respectively transforming the N-1 third transmission matrices obtained by frequencies into scattering matrices; obtaining a frequency response of a signal received by a virtual probe by adding a frequency response of the reference element antenna to results of multiplying each frequency response of the remaining N-1 element antennas by each of elements, among elements of the scattering matrices, indicating a CFR to a signal path from the input of the reference element antenna to the output of the just before IC driving any one of the remaining N-1 element antennas; obtaining a CIR by performing an inverse Fourier transform on the frequency response of the received signal; and determining there is an abnormal path output when the CIR has a plurality of responses distinct in time.

The obtaining of, by frequencies, the N-1 first transmission matrices may include, by obtaining, through CEM, a scattering matrix for an N-port network using, as N ports, an input of the reference element antenna of the virtual phased array antenna and inputs of the just before ICs driving the remaining N-1 element antennas excluding the reference element antenna, obtaining a scattering matrix of the N-1 first 2-port networks and obtaining the N-1 first transmission matrices by transforming the scattering matrices respectively for the first 2-port networks into transmission matrices.

The obtaining of, by frequencies, the N-1 second transmission networks may include obtaining the N-1 second transmission matrices by transforming scattering matrices respectively for the just before ICs into transmission matrices.

The N-1 second transmission matrices may be transmission matrices for BFICs when the just before ICs are BFICs.

The N-1 second transmission matrices may be transmission matrices for PAICs when the just before ICs are PAICs.

The obtaining of, by frequencies, the N-1 second transmission matrices may include transforming a transmission matrix of a transmission line having a length corresponding to a group delay of each of the just before ICs into a scattering matrix, multiplying a gain of each of the just before ICs by a corresponding element of the scattering matrix, and transforming the scattering matrix back into the transmission matrix.

The frequency responses of the remaining N-1 element antennas and the frequency response of the reference element antenna may be obtained by selecting a value in an arbitrarily determined one direction of an active element pattern for each of the N element antennas obtained through a basic CEM simulation performed to design a phased array antenna.

An aspect provides a method and device for determining whether an abnormal path output has occurred through simulation.

Another aspect also provides a method and device for check a change in array antenna radiation characteristics due to the occurrence of an abnormal path output in a designed phased array antenna through simulation, prior to manufacturing the phased array antenna.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the present disclosure will become apparent and more readily appreciated from the following description of example embodiments, taken in conjunction with the accompanying drawings of which.

DETAILED DESCRIPTION

Figure 1:
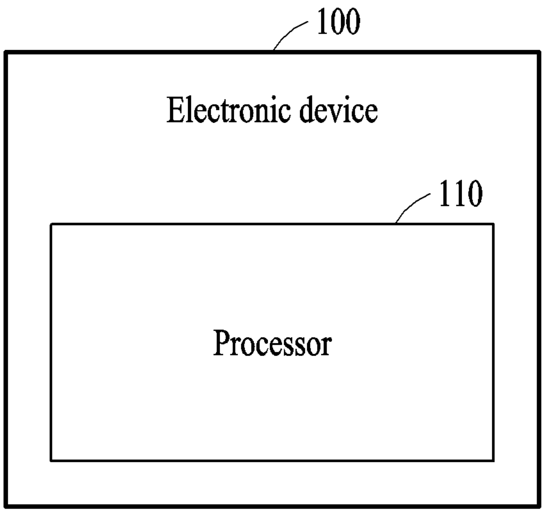
FIG. 1 is a diagram illustrating an electronic device according to an embodiment.

Hereinafter, examples are described in detail with reference to the accompanying drawings. The scope of the right, however, should not be construed as limited to the embodiments set forth herein. In the drawings, like reference numerals are used for like elements.

Various modifications may be made to the examples. Here, the examples are not construed as limited to the disclosure and should be understood to include all changes, equivalents, and replacements within the idea and the technical scope of the disclosure.

Although terms of "first" or "second" are used to explain various components, the components are not limited to the terms. These terms should be used only to distinguish one component from another component. For example, a first component may be referred to as a second component, and similarly the second component may also be referred to as the first component.

The terminology used herein is for the purpose of describing particular examples only and is not to be limiting of the examples. As used herein, the singular forms "a", "an", and "the" are intended to include the plural forms as well, unless the context clearly indicates otherwise. As used herein, "A or B", "at least one of A and B", "at least one of A or B", "A, B or C", "at least one of A, B and C", and "at least one of A, B, or C," each of which may include any one of the items listed together in the corresponding one of the phrases, or all possible combinations thereof. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms including technical and scientific terms used herein have the same meaning as commonly understood by one of ordinary skill in the art to which embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

When describing the examples with reference to the accompanying drawings, like reference numerals refer to like constituent elements and a repeated description related thereto will be omitted. In the description of embodiments, detailed description of well-known related structures or functions will be omitted when it is deemed that such description will cause ambiguous interpretation of the present disclosure.

Hereinafter, example embodiments will be described in detail with reference to the accompanying drawings.

FIG. 1 is a diagram illustrating an electronic device according to an embodiment.

FIG. 1 illustrates an electronic device 100. The electronic device 100 may provide the design of an antenna by using a computational electromagnetics (CEM) simulation.

The electronic device 100 may include a processor 110. The processor 110 may perform overall functions for controlling the electronic device 100. The processor 110 may generally control the electronic device 100 by executing programs and/or instructions stored in a memory (not shown). The processor 110 may be implemented as a central processing unit (CPU), a graphics processing unit (GPU), or the like, but examples are not limited thereto.

The processor 110 may perform a simulation in a method according to the present disclosure, which helps determine whether an abnormal path output occurs before manufacturing when intending to implement a phased array antenna including an active element in an antenna in package (AiP) form. Here, the abnormal path output may refer to an output signal having passed an element antenna in the phased array antenna being input to the just before integrated circuit (IC) driving another element antenna by mutual coupling and so on, and being output through the other element antenna.

Figure 2:
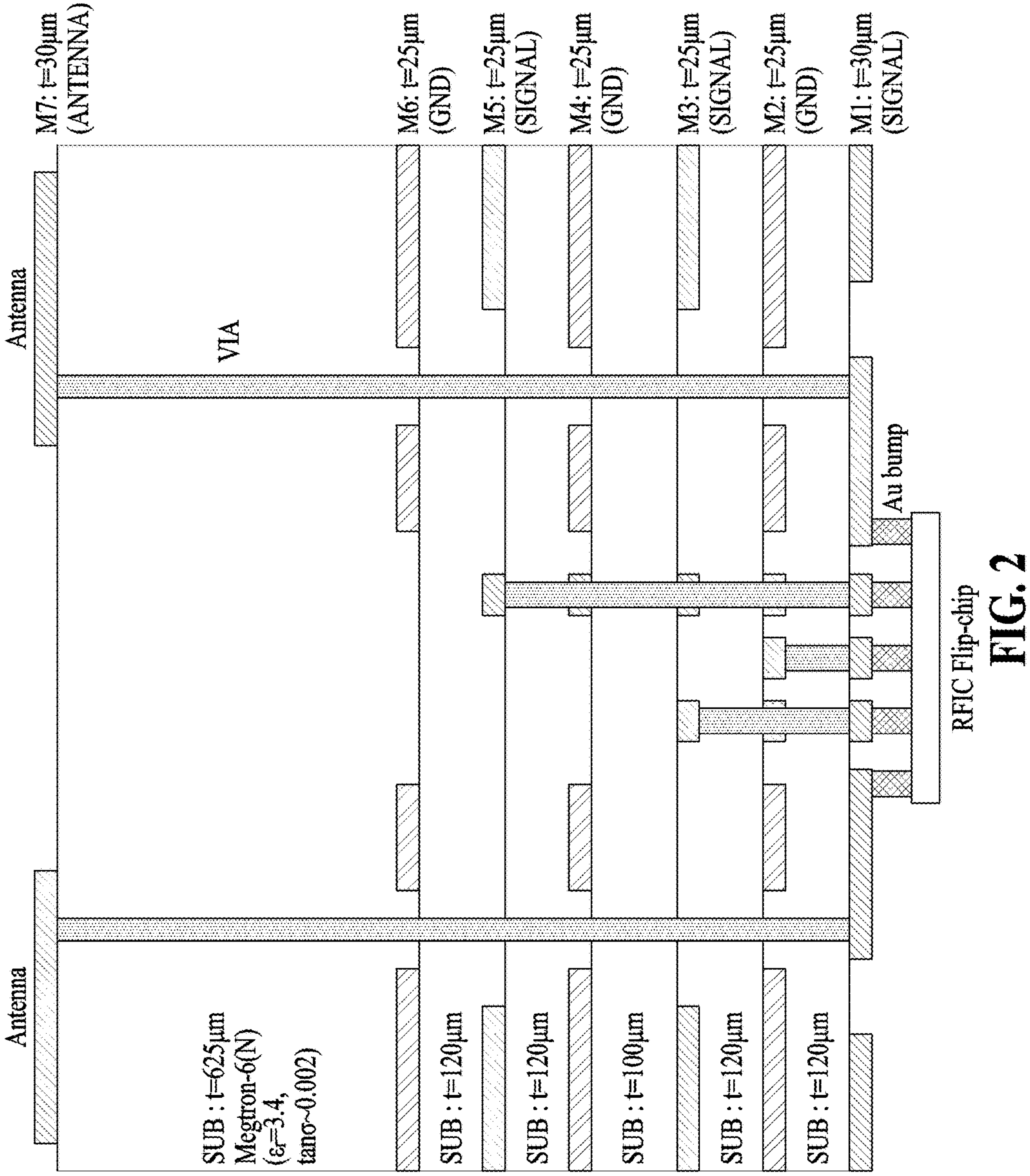
FIG. 2 is a side view of a multilayer substrate antenna in package (AiP) for illustrating a phased array antenna in an AiP form.

FIG. 2 is a side view of a multilayer substrate AiP for illustrating a phased array antenna in an AiP form.

The phased array antenna includes a plurality of element antennas. By driving each element antenna included in an array antenna through a driving signal determined according to a target beam direction, a radiation pattern of the array antenna may be in a desired shape. Element antenna drive circuits may be collectively referred to as a beam forming network (BFN). The BFN may control the phase of, or the phase and amplitude of, driving signals for element antennas connected to the BFN.

A commercial beam forming integrated chip (BFIC) may exist, in a frequency band in which a demand for a phased array antenna is high. Accordingly, the BFN may include a plurality of BFICs. When combining the BEN including the plurality of BFICs with a plurality of element antennas, an AiP form, which integrally implements the BEN and the plurality of element antennas on a multilayer substrate, may be used. FIG. 2 illustrates an example of the side view of a phased array antenna implemented in an AiP form.

An AiP includes N links connecting the BEN including the plurality of BFICs to N element antennas. The AiP may include links configured to control the BFICs. The AiP may include links configured to supply power to the BFICs.

Each channel of the BFICs may be connected to each element antenna. Each channel of the BFICs may include a variable phase shifter and a variable attenuator. The BFICs may adjust the amplitude and phase of a signal that passes each channel of the BFICs through the variable phase shifter and the variable attenuator. In transmit direction, each channel of the BFICs includes a power amplifier (PA) at the end, and, in many cases, an output power upper limit of the PA may determine the upper limit of drive signal power for an element antenna.

When configuring the BEN, a PA IC having a higher output power upper limit than that of an internal PA of a BFIC may be placed between an output of each channel and an input of an element antenna to improve effective isotropically radiated power (EIRP). In this case, the PA IC may be connected to the BFIC and the element antenna, and the just before IC of the element antenna may be the PA IC.

When the plurality of element antennas is implemented in the AiP form, an output signal having passed an element antenna may be input to the just before IC driving another element antenna by mutual coupling and so on, and may be output through the other element antenna. That is, an abnormal path output may occur.

Even if an abnormal path output occurs (that is, there is an abnormal path output), an impact may not be great in a structure without an active element. On the other hand, when there is an IC driving an element antenna, the IC includes an active element, such as an amplifier. In this case, when an output signal having passed an element antenna is input to the IC driving another element antenna through mutual coupling and so on, an amplified signal drives the other element antenna, and thus, the impact of the abnormal path may be great.

When there is an abnormal path output, the characteristics of the phased array antenna may differ from what was designed. When there is an abnormal path output, an unexpected output signal occurs through an unexpected element antenna, and a pattern of the phased array antenna may differ from what has been designed. When there is an abnormal path output, an unexpected output signal occurs through an unexpected element antenna, and an EIRP upper limit of the phased array antenna may differ from what has been designed.

The manufacturing of the phased array antenna on a multilayer substrate in an AiP form may require a large amount of cost and time. Accordingly, at a stage where the phased array antenna is being designed (that is, a stage before the manufacturing of the phased array antenna), whether an abnormal path output occurs may need to be verified.

Figure 3:
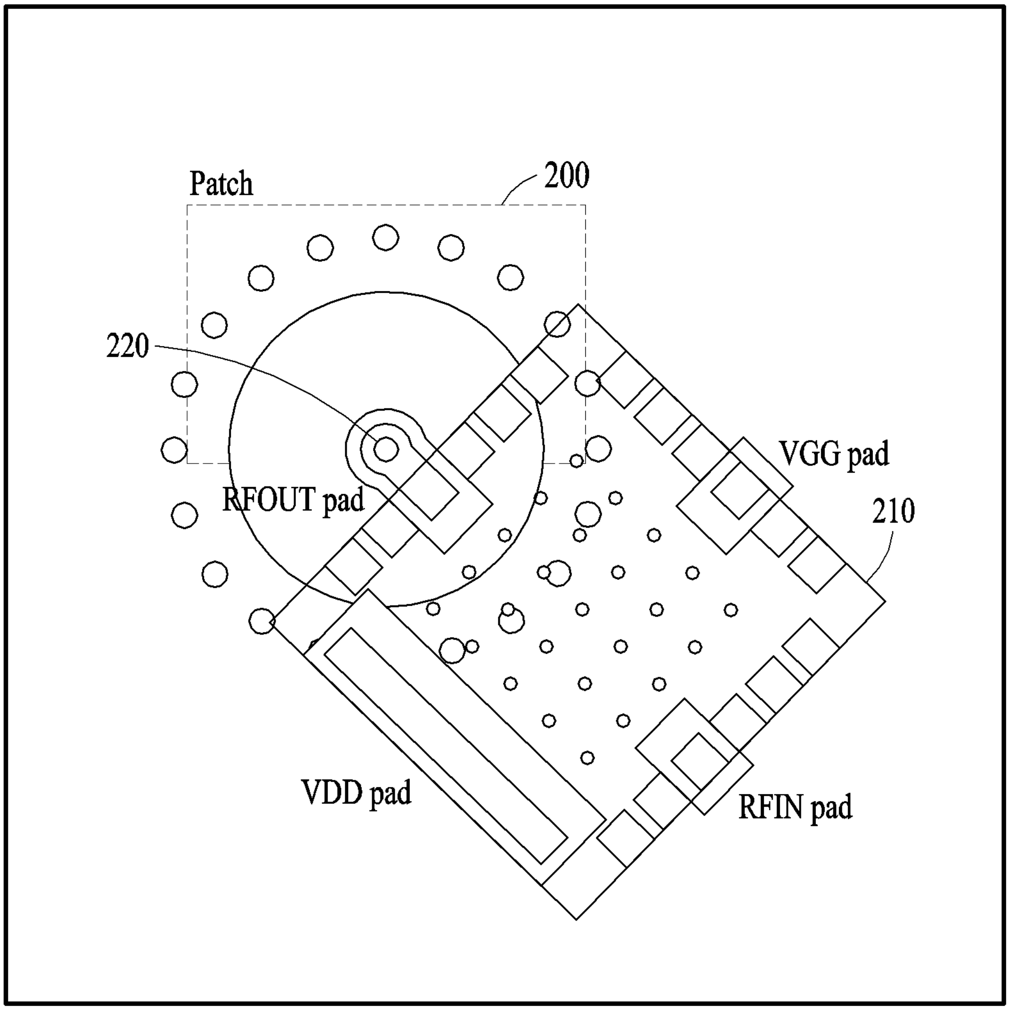
FIG. 3 is a diagram illustrating an element antenna feeding portion of a virtual phased array antenna modeled in a computational electromagnetics (CEM) simulation, according to an embodiment.

FIG. 3 is a diagram illustrating an element antenna feeding portion of a virtual phased array antenna modeled in a CEM simulation, according to an embodiment.

An antenna may be designed generally through simulation. For example, the antenna may be designed through a CEM simulation or the like.

Referring to FIG. 3, regarding an element antenna included in the virtual phased array antenna, an element antenna 200 on the front side is illustrated as being projected onto the back side. In addition, FIG. 3 illustrates pads 210 on which a just before IC is placed and a feeding via 220. Although not shown in FIG. 3, the just before IC driving the element antenna 200 is mounted on the pads 210. The just before IC may be connected to the element antenna 200 on the front side through the feeding via 220.

The virtual phased array antenna may include wiring in a CEM simulation. However, all or only some of the wiring of a designed phased array antenna may be reflected on the wiring in the CEM simulation, depending on a situation. For example, some of the wiring may be reflected in an appropriate range if the wiring is too complicated to be reflected on the CEM simulation or a CEM simulation time increase, due to the reflection of the wiring, is too heavy.

To apply the method of the present disclosure, the phased array antenna CEM simulation may include at least (even though only some of the wiring is reflected thereon) a mounting pad of the just before IC driving an element antenna, as illustrated in FIG. 3.

Figure 4A:
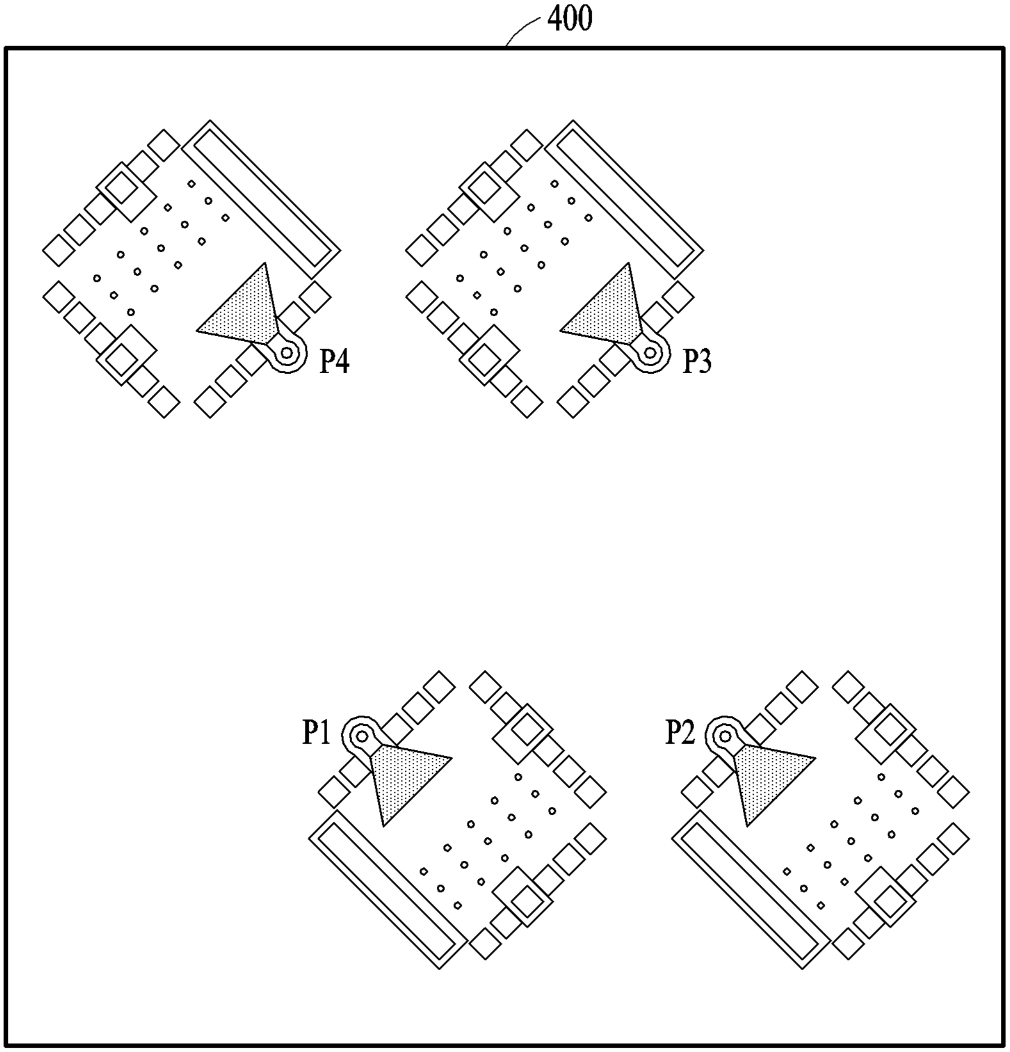
FIGS. 4A and 4B are diagrams illustrating a basic simulation and a coupling simulation of a virtual 2×2 phased array antenna according to an embodiment.
Figure 4B:
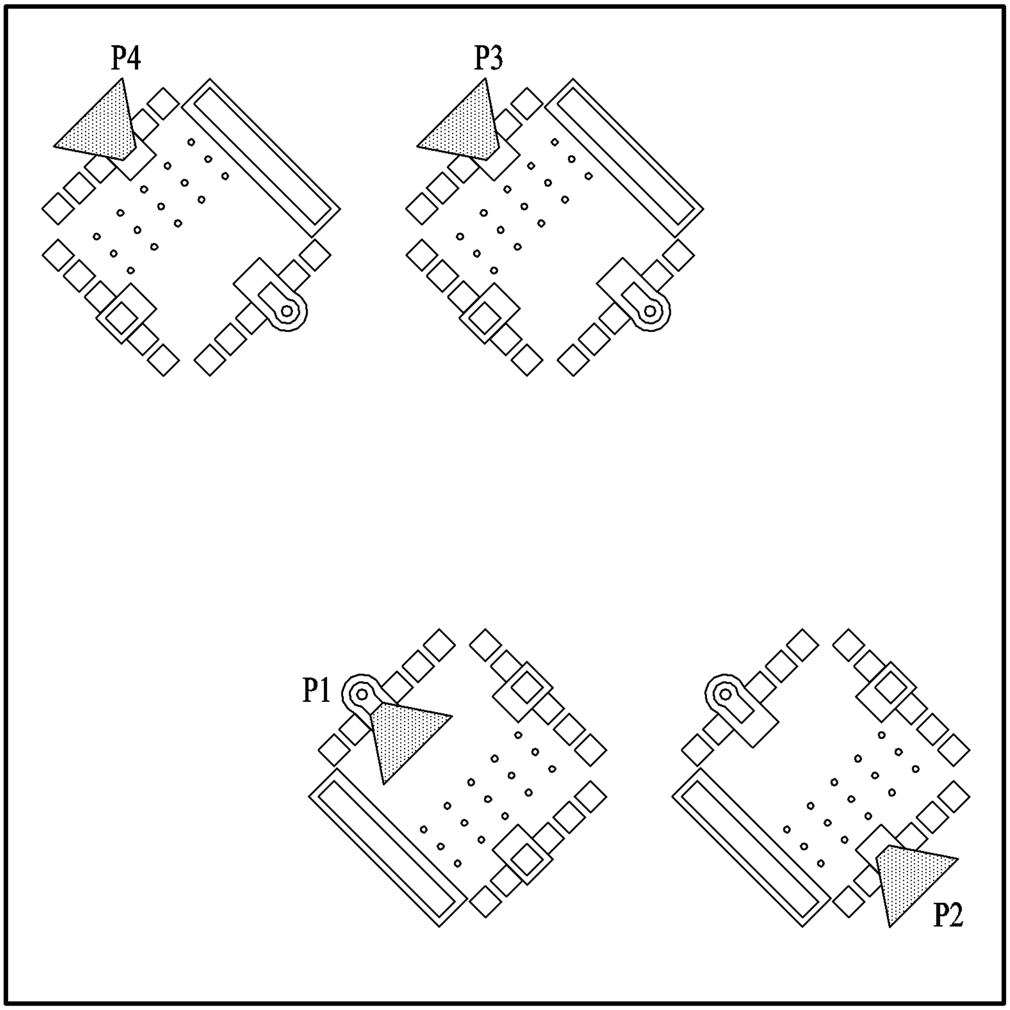

FIGS. 4A and 4B are diagrams illustrating a basic simulation and a coupling simulation of a virtual 2×2 phased array antenna according to an embodiment.

FIG. 4A illustrates the back side of a virtual 2×2 phased array antenna 400 that is implemented through a CEM simulation. The 2×2 phased array antenna 400 includes four element antennas. Ports that have applied input signals driving four element antennas in the CEM simulation are illustrated as P1, P2, P3, and P4, respectively.

In many cases, the 2×2 phased array antenna 400 may be designed to have a desired level of performance (e.g., a reflection coefficient, an antenna gain, the accuracy of beam steering, etc.) by adjusting the size and/or shape of element antennas, a space between the element antennas, or the feeding structure of an element antenna through the CEM simulation, which is referred to as a basic simulation for the description hereinafter.

The element antennas are connected to a just before ICs. The just before ICs are on the back side of the virtual 2×2 phased array antenna 400 and may be connected to the element antennas through the feeding via that is stated above with reference to FIG. 3. If each of the element antennas is connected to a PA IC, the just before IC may be the PA IC. If each of the element antennas is connected to a BFIC, the just before IC may be the BFIC.

FIG. 4B illustrates a CEM simulation that is performed, while maintaining a port for a reference element antenna in the basic simulation, by moving ports for the remaining element antennas in the basic simulations to inputs of just before ICs that drive the element antennas. By doing so, scattering matrices for three first 2-port networks having, as two ports, i) an input of the reference element antenna and ii) an input of the just before IC driving any one of the remaining three element antennas excluding the reference element antenna among four element antennas, are obtained. Hereinafter, this is referred to as a coupling simulation.

A simulation method of generating results that help a processor determine whether an abnormal path output occurs in the virtual 2×2 phased array antenna 400 is described below. However, the method to be described below is not limited to the 2×2 phased array antenna 400 but may also be applied to a phased array antenna that has a different array, such as 4×4. In addition, it is assumed, in the description below, that active element patterns have been obtained in the basic simulation.

Hereinafter, the element antenna to which P1 is set in FIGS. 4A and 4B is assumed to be the reference element antenna, and the portions to which P2 to P4 are set are assumed to be the remaining element antennas or inputs of the just before ICs that drive the remaining element antennas. Furthermore, the description below relates to the coupling simulation of FIG. 4B, not FIG. 4A, unless otherwise described. In addition, the description is provided by using P1 and P3, but the present disclosure is not limited thereto. It is obvious for those skilled in the art that the description below may also be applied to remaining N-1 element antennas excluding a reference element antenna among N element antennas with any one of the N element antennas being determined to be the reference element antenna.

Figure 5:
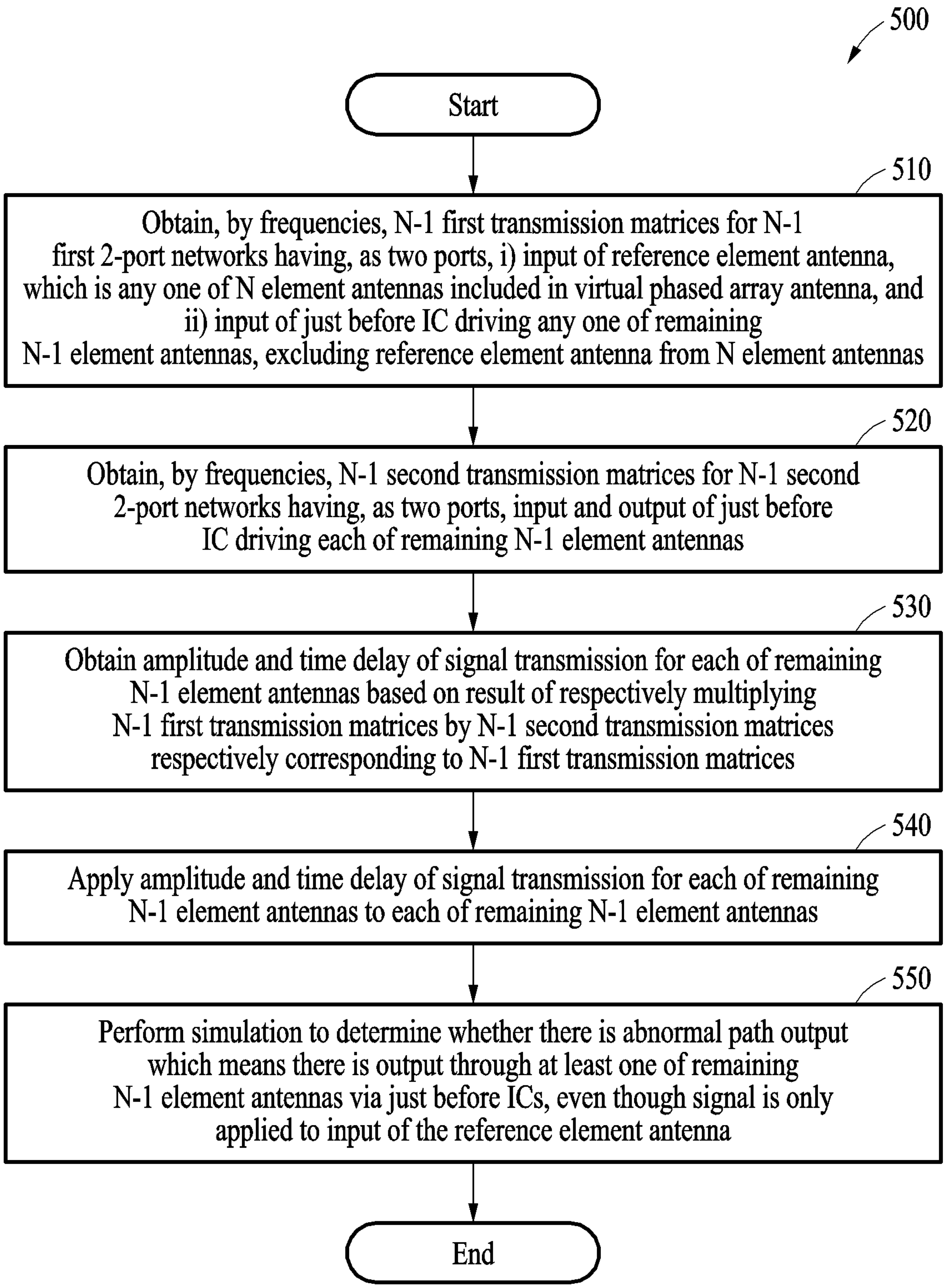
FIGS. 5, 6 and 7 are flowcharts illustrating a method of determining whether an abnormal path output occurs in the virtual 2×2 phased array antenna according to an embodiment.

Referring to FIG. 5, flowchart 500 illustrates a method of determining whether an abnormal path output occurs.

In operation 510, a processor may obtain, by frequencies, N-1 first transmission matrices for N-1 first 2-port networks having, as two ports, i) an input of a reference element antenna, which is any one of N element antennas included in a virtual phased array antenna, and ii) an input of a just before IC driving any one of remaining N-1 element antennas, excluding the reference element antenna from the N element antennas.

The processor may obtain the first transmission matrices by transforming a scattering matrix for each of the N-1 first 2-port networks into a transmission matrix.

The processor may obtain an S-parameter through simulation. By using the obtained S-parameter, the processor may obtain, by frequencies, the N-1 first transmission matrices for the N-1 first 2-port networks having, as two ports, i) the input of the reference element antenna, which is any one of N element antennas included in the virtual phased array antenna, and ii) the input of the just before IC driving any one of the remaining N-1 element antennas, excluding the reference element antenna.

For example, through a coupling simulation, the processor may obtain the scattering matrix (Equation 1, Equation 2, etc.) for a first 2-port network having, as two ports, the input of the reference element antenna and the input of the just before IC that drives any one of the remaining element antennas.

$$[S]_{31} = \begin{bmatrix} S_{11} & S_{13} \\ S_{31} & S_{33} \end{bmatrix} \quad \text{[Equation 1]}$$

$$[S]_{41} = \begin{bmatrix} S_{11} & S_{14} \\ S_{41} & S_{44} \end{bmatrix} \quad \text{[Equation 2]}$$

The processor may transform the scattering matrix into a transmission matrix. The transformation equation between a scattering matrix and a transmission matrix in a 2-port network is well known and is not described, however, by using the transformation equation, for example, the first transmission matrix for the 2-port network including P1 and P3 may be obtained as shown in Equation 3.

$$[S]_{31} = \begin{bmatrix} S_{11} & S_{13} \\ S_{31} & S_{33} \end{bmatrix} \rightarrow [ABCD]_{31} = \begin{bmatrix} A_{31} & B_{31} \\ C_{31} & D_{31} \end{bmatrix} \quad \text{[Equation 3]}$$

In operation 520, the processor may obtain, by frequencies, N-1 second transmission matrices for N-1 second 2-port networks having, as two ports, an input and output of the just before IC driving each of the remaining N-1 element antennas.

The processor may obtain the N-1 second transmission matrices by transforming scattering matrices respectively for the just before ICs into transmission matrices.

The processor may obtain a scattering matrix for a just before IC and may transform the obtained scattering matrix into a transmission matrix. The just before IC may be a BFIC or a PA IC. In this case, the processor may obtain the second transmission matrix of the just before IC by using the scattering matrix provided by a manufacturer for the just before IC. Since the transformation equation between a scattering matrix and a transmission matrix is well known, the method of obtaining the second transmission matrix by using the scattering matrix of the just before IC is not described. For example, the second transmission matrix of the just before IC that drives the element antenna connected to P3 of FIG. 4A is represented by Equation 4 below.

$$[ABCD]_{IC} = \begin{bmatrix} A_{IC} & B_{IC} \\ C_{IC} & D_{IC} \end{bmatrix} \quad \text{[Equation 4]}$$

However, the manufacturer may not provide the scattering matrix for the just before IC. In this case, the scattering matrix may be obtained directly by measuring an evaluation board (EVB) of the just before IC and the obtained scattering matrix may be transformed into a transmission matrix.

Alternatively, the processor may transform a transmission matrix of a transmission line having a length corresponding to the group delay, when the group delay of each of the just before ICs is provided, into a scattering matrix, multiplying a gain of each of the just before ICs by a corresponding element of the scattering matrix, and may transform the scattering matrix back into the transmission matrix. If the group delay of the just before IC is not provided, the transmission matrix may be obtained through the method described above by using a group delay of an IC having a similar function.

Alternatively, if the manufacturer provides neither the scattering matrix nor group delay of the just before IC, a value obtained by multiplying a gain of the just before IC by $S_{31}$ of Equation 1 may be assumed to be $S_{IC3output,1}(f)$ to be obtained in Equation 5.

In operation 530, the processor may obtain the amplitude and time delay of signal transmission for each of the remaining N-1 element antennas based on a result of respectively multiplying the N-1 first transmission matrices by the N-1 second transmission matrices respectively corresponding to the N-1 first transmission matrices.

The method of the processor obtaining the amplitude and time delay of the signal transmission for each of the remaining N-1 element antennas is described with reference to FIG. 6.

In operation 540, the processor may apply the amplitude and time delay of the signal transmission for each of the remaining N-1 element antennas to each of the remaining N-1 element antennas.

In operation 550, the processor may perform a simulation to determine whether there is an abnormal path output which means there is an output through at least one of the remaining N-1 element antennas via the just before ICs, even though a signal is only applied to the input of the reference element antenna.

The method of determining whether there is an abnormal path output through simulation is further described below with reference to FIG. 7.

Figure 6:
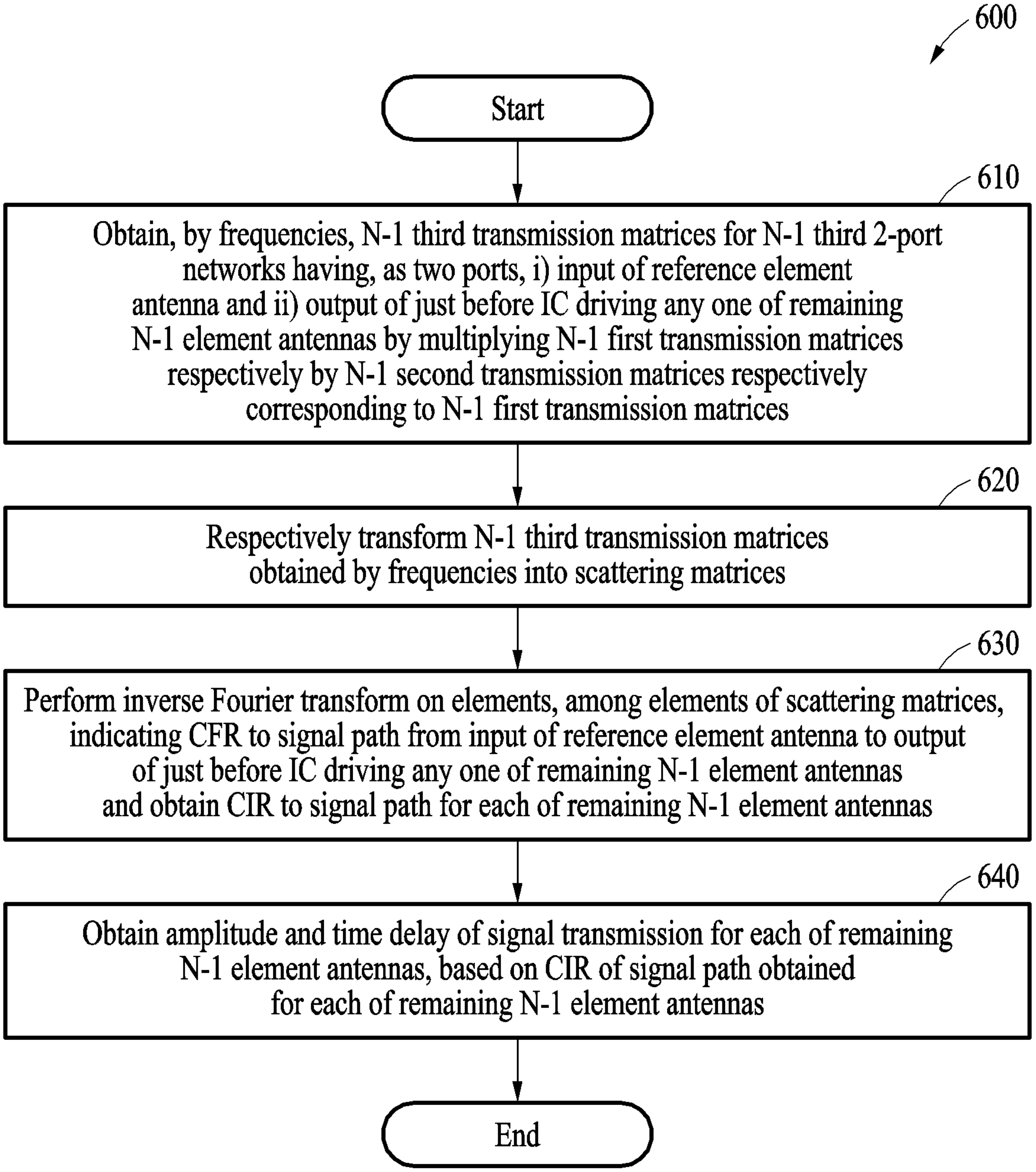

FIG. 6 illustrate a method of obtaining the amplitude and time delay of the signal transmission for each of the remaining N-1 element antennas.

In operation 610, a processor may obtain, by frequencies, N-1 third transmission matrices for N-1 third 2-port networks having, as two ports, i) an input of a reference element antenna and ii) an output of a just before IC driving any one of remaining N-1 element antennas by multiplying N-1 first transmission matrices respectively by N-1 second transmission matrices respectively corresponding to the N-1 first transmission matrices.

In operation 620, the processor may respectively transform the N-1 third transmission matrices obtained by frequencies into scattering matrices.

In other words, the processor may obtain a third transmission matrix by multiplying a first transmission matrix by a second transmission matrix and may transform the third transmission matrix back into a scattering matrix.

For example, a first transmission matrix of a first 2-port network having, as ports, an input of a reference element antenna and an input of a just before IC that drives another element antenna may be multiplied by a second transmission matrix for the just before IC. The multiplied result may be a third transmission matrix for a third 2-port network having, as ports, the input of the reference element antenna and the output of the just before IC that drives the other element antenna. The third transmission matrix may be transformed back into the scattering matrix. Such a relationship is represented by Equation 5 below by connecting Equation 3 to Equation 4.

$$[ABCD]_{31}\cdot[ABCD]_{IC}=\begin{bmatrix}A_{IC-31} & B_{IC-31}\\ C_{IC-31} & D_{IC-31}\end{bmatrix}\rightarrow[S]_{IC-31}=\begin{bmatrix}S_{11(cascade)} & S_{1,IC3output}\\ S_{IC3output,1} & S_{IC3output,IC3output}\end{bmatrix}\quad\text{[Equation 5]}$$

Here, "IC3output" may refer to the output of the just before IC that drives an element antenna that is connected to P3 of FIG. 4A.

In operation 630, the processor may perform an inverse Fourier transform on elements, among elements of the scattering matrices, indicating a channel frequency response (CFR) to a signal path from the input of the reference element antenna to the output of the just before IC driving any one of the remaining N-1 element antennas and obtaining a channel impulse response (CIR) to the signal path for each of the remaining N-1 element antennas. That is, the processor may obtain the amplitude and time delay of the signal transmission for each of the remaining N-1 element antennas, based on the scattering matrices.

In Equation 5 above, an element indicating the CFR in the third 2-port network having, as ports, the input of the reference element antenna and the output of the just before IC that drives the other element antenna may be $S_{IC3output,1}$. Since the CFR is obtained by frequencies, $S_{IC3output,1}(f)$ may be obtained.

In other words, the CFR of a channel that is input to the just before IC that drives the other element antenna through various couplings, even though a signal is input to the reference element antenna, to be in an input of the other element antenna may be obtained.

The processor may perform an inverse Fourier transform on the CFR and may obtain the CIR. The relationship between the CFR and the CIR is represented by Equation 6 below.

$$S_{IC3\,output,1}(f)=CFR_{IC3\,output,1}\leftarrow\text{Fourier pair}\rightarrow CIR_{IC3\,output,1}=h_{IC3\,output,1}(t)\quad\text{[Equation 6]}$$

In operation 640, the processor may obtain the amplitude and time delay of the signal transmission for each of the remaining N-1 element antennas, based on the CIR of the signal path obtained for each of the remaining N-1 element antennas.

When the CIR has one response, the processor may determine the amplitude and time delay of the response to be the amplitude and time delay of the signal transmission. When the CIR has a plurality of responses distinct in time, the processor may determine the amplitude and time delay of a response having the largest lobe among the plurality of responses to be the amplitude and time delay of the signal transmission.

For example, the processor may obtain an amplitude C31 and time delay τ31 of signal transmission from the reference element antenna to P3 of FIG. 4A. Likewise, according to the method described above, an amplitude C41 and time delay τ41 of signal transmission from the reference element antenna to P4 of FIG. 4A may be obtained, and an amplitude C21 and time delay τ21 of signal transmission from the reference element antenna to P2 of FIG. 4A may be obtained.

Figure 7:
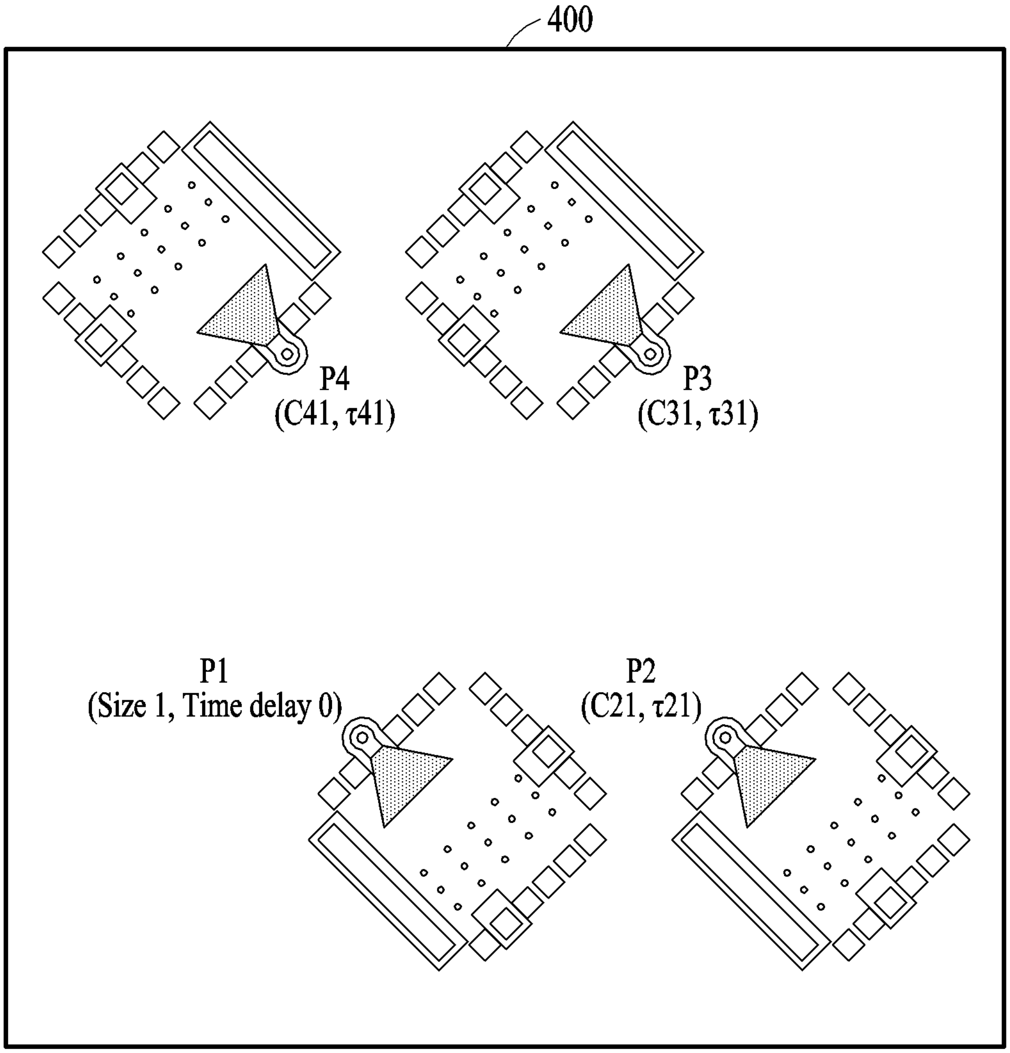

FIG. 7 illustrates the setting of performing excitation on the reference element antenna through a drive signal for driving the reference element antenna and simultaneously performing excitation on the remaining N-1 element antennas through signals having the amplitude and time delay of the signal transmission obtained compared to the drive signal and performing simulation. In other words, if the amplitude and time delay of a signal that drives the reference element antenna are 1 and 0, respectively, the amplitude and time delay of a signal that drives other element antennas are set to C21 and τ21, C31 and τ31, and C41 and τ41, respectively.

Figure 8:
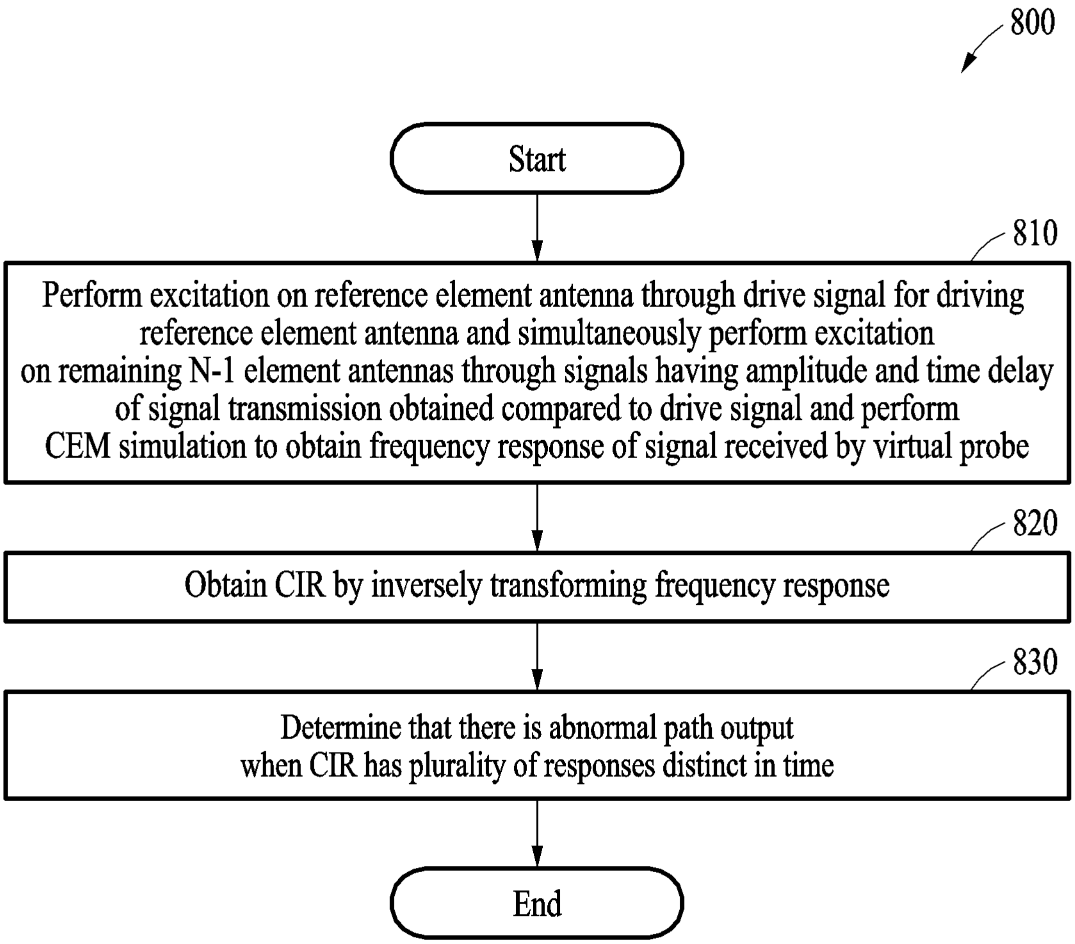
FIG. 8 is a diagram illustrating a method of determining whether there is an abnormal path output, according to an embodiment.

FIG. 8 is diagram 800 illustrating a method of determining whether there is an abnormal path output, according to an embodiment.

A processor may determine whether there is an abnormal path output through simulation applying the amplitude and time delay of signal transmission for each element antenna included in a virtual phased array antenna.

In operation 810, the processor may perform excitation on the reference element antenna through a drive signal for driving the reference element antenna and simultaneously perform excitation on the remaining N-1 element antennas through signals having the amplitude and time delay of the signal transmission obtained compared to the drive signal and may perform a CEM simulation to obtain a frequency response of a signal received by a virtual probe.

The processor may obtain a far-field feature (a signal feature), by frequencies, in a front direction (as long as constant, a direction is not necessarily the front direction) of the phased array antenna through simulation. In this case, element antennas included in the phased array antenna should be excited simultaneously. The far-filed feature obtained by frequencies is represented by Equation 7.

$$\text{OTA\_1}(f)\quad\text{[Equation 7]}$$

OTA_1(f) may be a value obtained by dividing, by a constant, a frequency response that will be obtained through over-the-air (OTA) measurement in a situation where an input is applied only to the just before IC connected to a reference element antenna when an actual phased array antenna is manufactured. Since a measuring instrument is connected to an input of a BFN during the OTA measurement, the frequency response obtained from the OTA measurement may include an feature of the BEN and an feature of the just before IC connected to the reference element antenna. Therefore, the result obtained by dividing the frequency response obtained through the OTA measurement by the constant may correspond to Equation 7.

In operation 820, the processor may obtain a CIR by inversely transforming the frequency response.

That is, the processor may obtain the CIR from OTA_1(f). Since OTA_1(f) is considered a CFR, the CIR may be obtained by performing an inverse Fourier transform on OTA_1(f). The inverse Fourier transform of OTA_1(f) may be represented by Equation 8 below.

[Equation 8]

$$OTA\_1(f) = CFR_{probe\ antenna,1} \leftarrow \text{Fourier pair} \rightarrow CIR_{probe\ antenna,1} = OTA_{probe\ antenna,1}(t)$$

In Equation 8, a probe antenna may be a probe antenna to be used in the OTA measurement.

In operation 830, the processor may determine that there is an abnormal path output when the CIR has a plurality of responses distinct in time.

Figure 9:
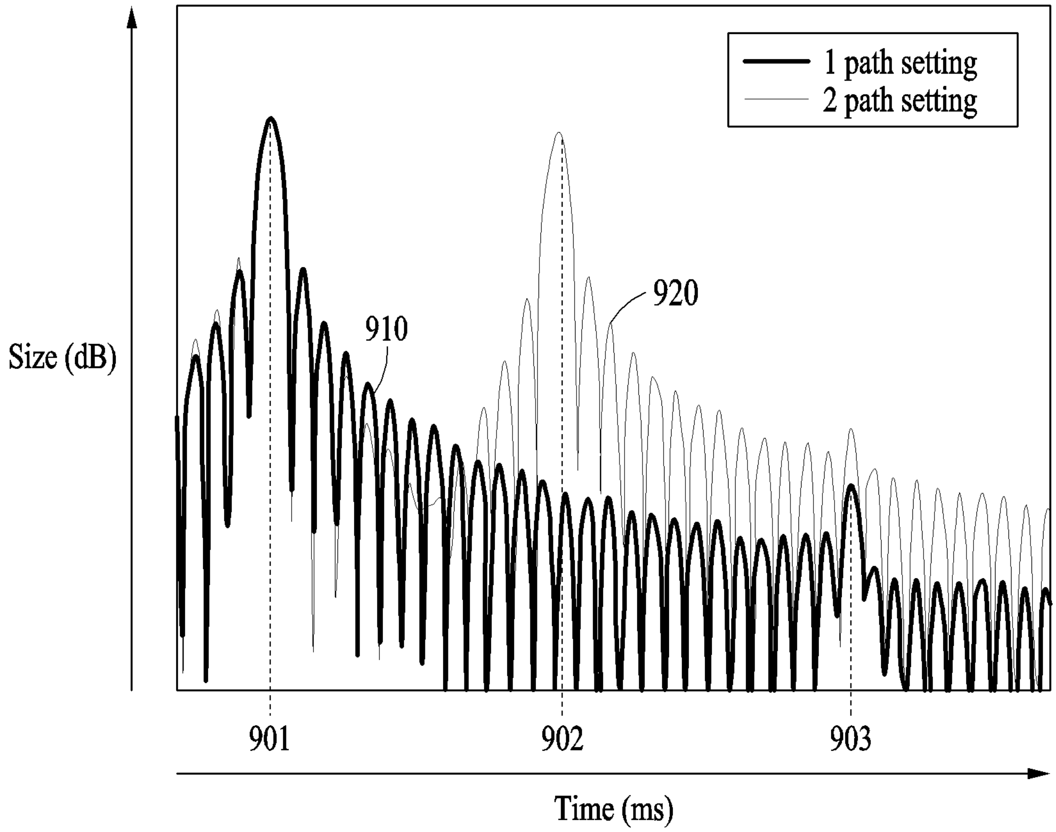
FIG. 9 is a graph illustrating a method of reading a graph of a channel impulse response (CIR), according to an embodiment.

FIG. 9 illustrates a response of a CIR according to an embodiment.

The processor may determine that an abnormal path output has not occurred when a CIR has one temporally clean response. In addition, even though the CIR has a plurality of responses distinct in time, the processor may determine that an abnormal path has been output but is ignorable when the size of a response occurring later is less than a threshold. In this case, the manufacturing of a simulated phased array antenna may be determined.

On the other hand, an electronic device may determine that there is an abnormal path when the CIR has the plurality of responses distinct in time. The electronic device may determine that there is an abnormal path when the CIR does not have one temporally clean response. In this case, the electronic device may determine that a structure may be improved such that the coupling from an input of an element antenna to an input of an IC that drives another element antenna decreases.

FIG. 9 illustrates graphs 910 and 920 which are graphs of the CIR according to an embodiment. Referring to graph 910, the CIR has a response at a first response time 901 and a response after a certain time at a third response time 903 again. That is, graph 910 may have the plurality of responses distinct in time. However, since the size of the second response is less than a threshold, the CIR may be determined to have one response. Accordingly, a phased array antenna corresponding to graph 910 may be determined that there is no abnormal path output.

On the other hand, referring to graph 920, the CIR has a response at a first response time 901 and a response after a certain time at a second response time 902 again. Since the size of the second response in graph 920 is greater than or equal to the threshold, the CIR may be determined to have the plurality of responses distinct in time. Accordingly, the phased array antenna corresponding to graph 920 may be determined that there is an abnormal path output.

Figure 10:
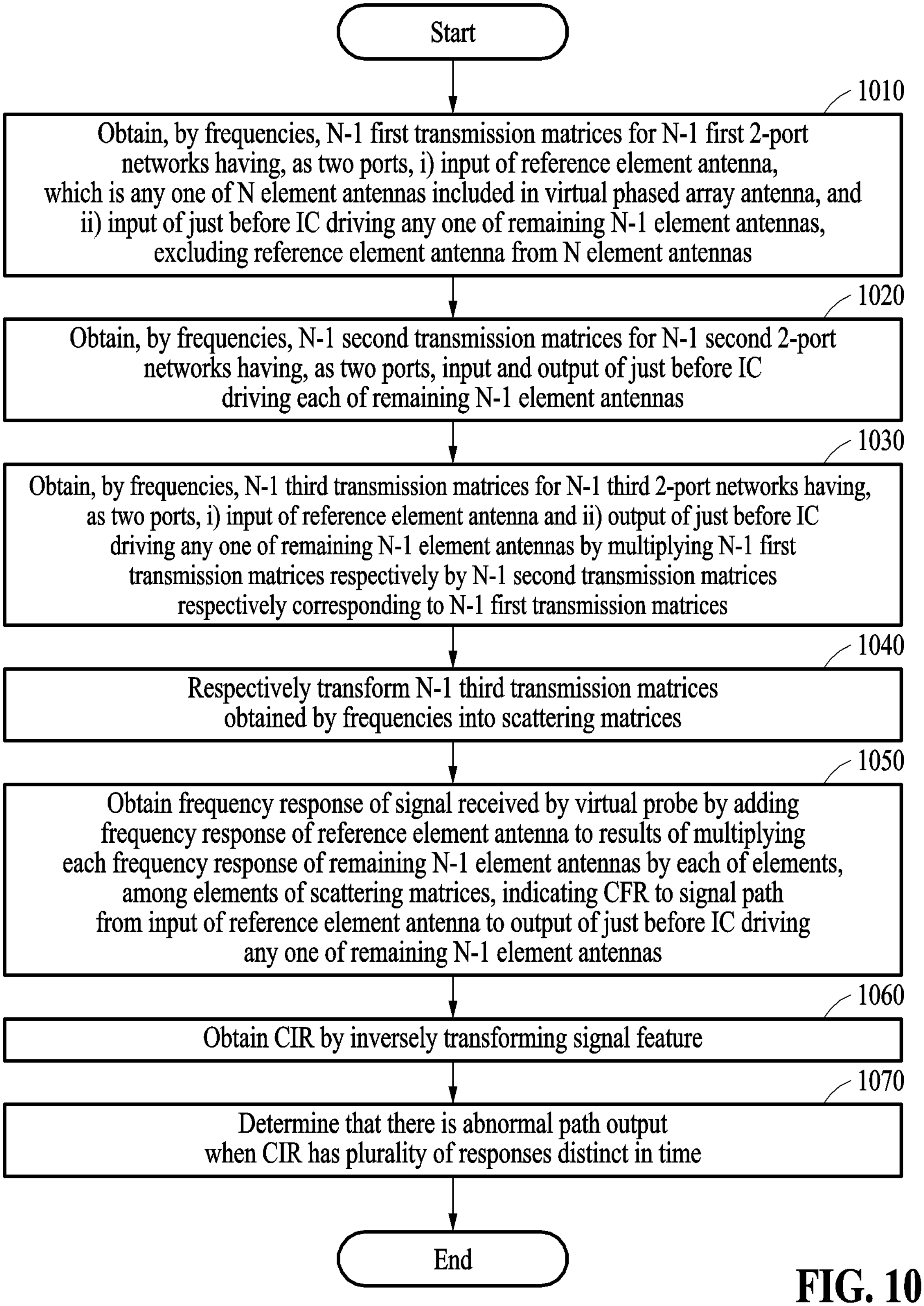
FIG. 10 is a flowchart illustrating a method of determining whether an abnormal path output occurs in a virtual phased array antenna according to another embodiment.

FIG. 10 is a flowchart illustrating a method of determining whether an abnormal path has occurred in a virtual phased array antenna according to another embodiment.

Hereinafter, the method of determining whether an abnormal path has occurred in a phased array antenna without using the amplitude and time delay of signal transmission of each port, unlike FIGS. 5 to 8, is explained.

In operation 1010, a processor may obtain, by frequencies, N-1 first transmission matrices for N-1 first 2-port networks having, as two ports, i) an input of a reference element antenna, which is any one of N element antennas included in a virtual phased array antenna, and ii) an input of a just IC driving any one of remaining N-1 element antennas, excluding the reference element antenna from the N element antennas.

In operation 1020, the processor may obtain, by frequencies, N-1 second transmission matrices for N-1 second 2-port networks having, as two ports, an input and output of the just before IC driving each of the remaining N-1 element antennas.

Since operations 1010 and 1020 are the same as operations 510 and 520 of FIG. 5, the description of operations 1010 and 1020 is omitted.

In operation 1030, a processor may obtain, by frequencies, N-1 third transmission matrices for N-1 third 2-port networks having, as two ports, i) the input of the reference element antenna and ii) the output of the just before IC driving any one of the remaining N-1 element antennas by multiplying the N-1 first transmission matrices respectively by the N-1 second transmission matrices respectively corresponding to the N-1 first transmission matrices.

In operation 1040, the processor may respectively transform the N-1 third transmission matrices obtained by frequencies into scattering matrices.

Since operations 1030 and 1040 are the same as operations 610 and 620 of FIG. 6, the description of operations 1030 and 1040 is omitted.

In operation 1050, the processor may obtain a frequency response of a signal received by a virtual probe by adding a frequency response of the reference element antenna to results of multiplying each frequency response of the remaining N-1 element antennas by each of elements, among elements of the scattering matrices, indicating a CFR to a signal path from the input of the reference element antenna to the output of the just before IC driving any one of the remaining N-1 element antennas.

Here, an example of the element, among the elements of the scattering matrices, indicating the CFR to a signal path from the input of the reference element antenna to the output of the just before IC driving any one of the remaining N-1 element antennas is $S_{IC3output,1}$, which is the element in a second row and a first column in Equation 5.

Here, the frequency responses of the remaining N-1 element antennas and the frequency response of the reference antenna may be obtained from an active element patterns obtained through the basic simulation as described with reference to FIG. 4A.

In other words, by multiplying each of the elements indicating the CFR in the scattering matrices by each frequency response for the remaining N-1 element antennas, the signal which means the input of the reference element antenna be input to each of the just before IC of the remaining element antennas through various couplings and reach a far-field through the remaining element antennas, may be approximately obtained.

For example, by multiplying $S_{IC3output,1}(f)$ by the frequency response of a third element antenna (the element antenna connected to P3 of FIG. 4A), the signal which means the input of the reference element antenna be input to the just before IC of the third element antenna through various couplings, passing the third element antenna and reaching a far-field, may be approximately calculated. That is, $I_{probe\ antenna\ from\ IC3\ output,1}(f)$ may be calculated by frequencies.

In the same method, $I_{probe\ antenna\ from\ IC2\ output,1}(f)$ and $I_{probe\ antenna\ from\ IC4\ output,1}(f)$ may be obtained.

Ultimately, the processor may add the results of multiplying each frequency response of the remaining N-1 element antennas by each of elements, among the elements of the scattering matrices, indicating the CFR to the signal path from the input of the reference element antenna to the output of the just before IC driving any one of the remaining N-1 element antennas. In other words, even though only the reference element antenna is excited, through various couplings, the frequency response of an abnormal path output, which is a signal output through the remaining element antennas via corresponding just before ICs, may be obtained. The frequency response of an abnormal path output may be represented by Equation 9.

$$\sum_{k=2}^{4} I_{probe\ antenna\ from\ ICk\ output,1}(f) \quad \text{[Equation 9]}$$

Then, the signal feature according to a frequency may be calculated by adding the frequency response of the reference element antenna to the frequency response of an abnormal path output. That is, OTA_1(f), which is the same result as the result of Equation 7, may be obtained by adding the frequency response of the reference element antenna to the frequency response of an abnormal path output. The method of obtaining OTA_1(f) by adding the frequency response of the reference element antenna to the frequency response of an abnormal path output is represented by Equation 10.

$$\mathrm{OTA\_1}(f) = I_{probe\ antenna\ from\ IC1\ output,1}(f) + \sum_{k=2}^{4} I_{probe\ antenna\ from\ ICk\ output,1}(f) \quad \text{[Equation 10]}$$

In operation 1060, the processor may obtain a CIR by inversely transforming the signal feature.

In operation 1070, the processor may determine that there is an abnormal path output when the CIR has a plurality of responses distinct in time.

Since operations 1060 and 1070 are the same as operations 820 and 830 of FIG. 8, the description of operations 1060 and 1070 is omitted.

Ultimately, the processor may determine whether there is an abnormal path output by using the method of simultaneously exciting ports after obtaining the amplitude and time delay of signal transmission of each port as described above with reference to FIGS. 5 to 9. Alternatively, the processor may determine whether there is an abnormal path output through the method described with reference to FIG. 10.

The method according to the present disclosure may be written in a computer-executable program and may be implemented as various recording media, such as magnetic storage media, optical reading media, or digital storage media.

Various techniques described herein may be implemented in digital electronic circuitry, computer hardware, firmware, software, or combinations thereof. The implementations may be achieved as a computer program product, i.e., a computer program tangibly embodied in an information carrier, e.g., in a machine-readable storage device (for example, a computer-readable medium) or in a propagated signal, for processing by, or to control an operation of, a data processing apparatus, e.g., a programmable processor, a computer, or multiple computers. A computer program, such as the computer program(s) described above, may be written in any form of a programming language, including compiled or interpreted languages, and may be deployed in any form, including as a stand-alone program or as a module, a component, a subroutine, or other units suitable for use in a computing environment. A computer program may be deployed to be processed on one computer or multiple computers at one site or distributed across multiple sites and interconnected by a communication network.

Processors suitable for processing of a computer program include, by way of example, both general and special purpose microprocessors, and any one or more processors of any kind of digital computer. Generally, a processor will receive instructions and data from a read-only memory or a random-access memory, or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Examples of information carriers suitable for embodying computer program instructions and data include semiconductor memory devices, e.g., magnetic media such as hard disks, floppy disks, and magnetic tape, optical media such as compact disk read only memory (CD-ROM) or digital video disks (DVDs), magneto-optical media such as floptical disks, read-only memory (ROM), random-access memory (RAM), flash memory, erasable programmable ROM (EPROM), or electrically erasable programmable ROM (EEPROM). The processor and the memory may be supplemented by or incorporated in special purpose logic circuitry.

In addition, non-transitory computer-readable media may be any available media that may be accessed by a computer and may include both computer storage media and transmission media.

Although the present specification includes details of a plurality of specific embodiments, the details should not be construed as limiting any invention or a scope that can be claimed, but rather should be construed as being descriptions of features that may be peculiar to specific embodiments of specific inventions. Specific features described in the present specification in the context of individual embodiments may be combined and implemented in a single embodiment. On the contrary, various features described in the context of a single embodiment may be implemented in a plurality of embodiments individually or in any appropriate sub-combination. Furthermore, although features may operate in a specific combination and may be initially depicted as being claimed, one or more features of a claimed combination may be excluded from the combination in some cases, and the claimed combination may be changed into a sub-combination or a modification of the sub-combination.

Likewise, although operations are depicted in a specific order in the drawings, it should not be understood that the operations must be performed in the depicted specific order or sequential order, or all the shown operations must be performed in order to obtain a preferred result. In specific cases, multitasking and parallel processing may be advantageous. In addition, it should not be understood that the separation of various device components of the aforementioned embodiments is required for all the embodiments, and it should be understood that the aforementioned program components and apparatuses may be integrated into a single software product or packaged into multiple software products.

The embodiments disclosed in the present specification and the drawings are intended merely to present specific examples in order to aid in understanding of the present disclosure but are not intended to limit the scope of the present disclosure. It will be apparent to one of ordinary skill in the art that various modifications based on the technical spirit of the present disclosure, as well as the disclosed embodiments, can be made.

What is claimed is:

1. An operating method of an electronic device, the operating method comprising:

obtaining, by frequencies, N-1 first transmission matrices for N-1 first 2-port networks having, as two ports, i) an input of a reference element antenna, which is any one of N element antennas comprised in a virtual phased array antenna, and ii) an input of a just before integrated circuit (IC) driving any one of remaining N-1 element antennas, excluding the reference element antenna from the N element antennas;

obtaining, by frequencies, N-1 second transmission matrices for N-1 second 2-port networks having, as two ports, an input and output of the just before IC driving each of the remaining N-1 element antennas;

obtaining a amplitude and time delay of signal transmission from the input of the reference element antenna to each input of the remaining N-1 element antennas, based on each result of respectively multiplying the N-1 first transmission matrices by the N-1 second transmission matrices respectively corresponding to the N-1 first transmission matrices; and, by applying the amplitude and time delay of the signal transmission from the input of the reference element antenna to each input of the remaining N-1 element antennas, performing a simulation to determine whether there is an abnormal path output which means there is an output through at least one of the remaining N-1 element antennas via the just before ICs, even though a signal is only applied to the input of the reference element antenna.

2. The operating method of claim 1, wherein the obtaining, by frequencies, the N-1 first transmission matrices comprises:

by obtaining, through computational electromagnetics (CEM), a scattering matrix for an N-port network using, as N ports, an input of the reference element antenna of the virtual phased array antenna and inputs of the just before ICs driving the remaining N-1 element antennas excluding the reference element antenna, obtaining a scattering matrix of the N-1 first 2-port networks and obtaining the N-1 first transmission matrices by transforming the scattering matrices respectively for the first 2-port networks into transmission matrices.

3. The operating method of claim 1, wherein the obtaining, by frequencies, the N-1 second transmission networks comprises:

obtaining the N-1 second transmission matrices by transforming scattering matrices respectively for the just before ICs into transmission matrices.

4. The operating method of claim 1, wherein the N-1 second transmission matrices are transmission matrices for beam forming integrated circuits (BFICs) when the just before ICs are BFICs.

5. The operating method of claim 1, wherein the N-1 second transmission matrices are transmission matrices for power amplifier integrated circuits (PAICs) when the just before ICs are PAICs.

6. The operating method of claim 1, wherein the obtaining, by frequencies, the N-1 second transmission matrices comprises:

transforming a transmission matrix of a transmission line having a length corresponding to a group delay of each of the just before ICs into a scattering matrix, multiplying a gain of each of the just before ICs by a corresponding element of the scattering matrix, and transforming the scattering matrix back into the transmission matrix.

7. The operating method of claim 1, wherein the obtaining the amplitude and time delay of the signal transmission for each of the remaining N-1 element antennas comprises:

obtaining, by frequencies, N-1 third transmission matrices for N-1 third 2-port networks having, as two ports, i) the input of the reference element antenna and ii) the output of the just before IC driving any one of the remaining N-1 element antennas by respectively multiplying the N-1 first transmission matrices by the N-1 second transmission matrices respectively corresponding to the N-1 first transmission matrices;

respectively transforming the N-1 third transmission matrices obtained by frequencies into scattering matrices; and obtaining the amplitude and time delay of the signal transmission for each of the remaining N-1 element antennas, based on the scattering matrices.

8. The operating method of claim 7, wherein the obtaining the amplitude and time delay of the signal transmission for each of the remaining N-1 element antennas, based on the scattering matrices, comprises:

performing an inverse Fourier transform on elements, among elements of the scattering matrices, indicating a channel frequency response (CFR) to a signal path from the input of the reference element antenna to the output of the just before IC driving any one of the remaining N-1 element antennas and obtaining a channel impulse response (CIR) to the signal path for each of the remaining N-1 element antennas; and obtaining the amplitude and time delay of the signal transmission for each of the remaining N-1 element antennas, based on the CIR to the signal path obtained for each of the remaining N-1 element antennas.

9. The operating method of claim 8, wherein the obtaining the amplitude and time delay of the signal transmission for each of the remaining N-1 element antennas, based on the CIR to the signal path obtained for each of the remaining N-1 element antennas, comprises:

when the CIR has one response, determining the amplitude and time delay of the response to be the amplitude and time delay of the signal transmission, and, when the CIR has a plurality of responses distinct in time, determining the amplitude and time delay of a response having the largest lobe among the plurality of responses to be the amplitude and time delay of the signal transmission.

10. The operating method of claim 1, wherein the performing the simulation comprises:

performing excitation on the reference element antenna through a drive signal for driving the reference element antenna and simultaneously performing excitation on the remaining N-1 element antennas through signals having the amplitude and time delay of the signal transmission obtained compared to the drive signal and performing a CEM simulation to obtain a frequency response of a signal received by a virtual probe;

obtaining a CIR by performing an inverse Fourier transform on the frequency response of the received signal; and determining there is the abnormal path output when the CIR has a plurality of responses distinct in time.

11. An operating method of an electronic device, the operating method comprising:

obtaining, by frequencies, N-1 first transmission matrices for N-1 first 2-port networks having, as two ports, i) an input of a reference element antenna, which is any one of N element antennas comprised in a virtual phased array antenna, and ii) an input of a just before integrated circuit (IC) driving any one of remaining N-1 element antennas, excluding the reference element antenna from the N element antennas;

obtaining, by frequencies, N-1 second transmission matrices for N-1 second 2-port networks having, as two ports, an input and output of the just before IC driving each of the remaining N-1 element antennas;

obtaining, by frequencies, N-1 third transmission matrices for N-1 third 2-port networks having, as two ports, i) the input of the reference element antenna and ii) the output of the just before IC driving any one of the remaining N-1 element antennas by respectively multiplying the N-1 first transmission matrices by the N-1 second transmission matrices respectively corresponding to the N-1 first transmission matrices;

respectively transforming the N-1 third transmission matrices obtained by frequencies into scattering matrices;

obtaining a frequency response of a signal received by a virtual probe by adding a frequency response of the reference element antenna to results of multiplying each frequency response of the remaining N-1 element antennas by each of elements, among elements of the scattering matrices, indicating a channel frequency response (CFR) to a signal path from the input of the reference element antenna to the output of the just before IC driving any one of the remaining N-1 element antennas;

obtaining a CIR by performing an inverse Fourier transform on the frequency response of the received signal; and determining there is an abnormal path output when the CIR has a plurality of responses distinct in time.

12. The operating method of claim 11, wherein the obtaining, by frequencies, the N-1 first transmission matrices comprises:

by obtaining, through computational electromagnetics (CEM), a scattering matrix for an N-port network using, as N ports, an input of the reference element antenna of the virtual phased array antenna and inputs of the just before ICs driving the remaining N-1 element antennas excluding the reference element antenna, obtaining a scattering matrix of the N-1 first 2-port networks and obtaining the N-1 first transmission matrices by transforming the scattering matrices respectively for the first 2-port networks into transmission matrices.

13. The operating method of claim 11, wherein the obtaining, by frequencies, the N-1 second transmission networks comprises:

obtaining the N-1 second transmission matrices by transforming scattering matrices respectively for the just before ICs into transmission matrices.

14. The operating method of claim 11, wherein the N-1 second transmission matrices are transmission matrices for beam forming integrated circuits (BFICs) when the just before ICs are BFICs.

15. The operating method of claim 11, wherein the N-1 second transmission matrices are transmission matrices for power amplifier integrated circuits (PAICs) when the just before ICs are PAICs.

16. The operating method of claim 11, wherein the obtaining, by frequencies, the N-1 second transmission matrices comprises:

transforming a transmission matrix of a transmission line having a length corresponding to a group delay of each of the just before ICs into a scattering matrix, multiplying a gain of each of the just before ICs by a corresponding element of the scattering matrix, and transforming the scattering matrix back into the transmission matrix.

17. The operating method of claim 11, wherein the frequency responses of the remaining N-1 element antennas and the frequency response of the reference element antenna are a feature of each frequency obtained by selecting a value in an arbitrarily determined one direction of an active element pattern for each of the N element antennas obtained through a basic CEM simulation performed to design a phased array antenna.

* * * * *